United States Patent
Wang

(10) Patent No.: US 9,535,443 B1
(45) Date of Patent: Jan. 3, 2017

(54) MIDDLE PHASE POWER-FETCHING TYPE PHASE FRONT/PHASE TAIL SYNCHRONIZED MODULATION CIRCUIT

(71) Applicant: Loong Yee Industrial Corp., Ltd., New Taipei (TW)

(72) Inventor: Chi-Jen Wang, New Taipei (TW)

(73) Assignee: Loong Yee Industrial Corp., Ltd., New Taipei (TW)

( * ) Notice: Subject to any disclaimer, the term of this patent is extended or adjusted under 35 U.S.C. 154(b) by 0 days.

(21) Appl. No.: 14/739,162

(22) Filed: Jun. 15, 2015

(51) Int. Cl.
  *H02P 1/00* (2006.01)
  *H02P 1/28* (2006.01)
  *H02P 3/00* (2006.01)
  *H02P 7/06* (2006.01)
  *G05F 3/04* (2006.01)
  *H05B 37/02* (2006.01)
  *H02P 29/00* (2016.01)

(52) U.S. Cl.
  CPC .............. *G05F 3/04* (2013.01); *H02P 29/0044* (2013.01); *H05B 37/0209* (2013.01)

(58) Field of Classification Search
  CPC .................................. G05F 3/04; H02P 29/0044
  USPC ......................................................... 318/504
  See application file for complete search history.

(56) References Cited

U.S. PATENT DOCUMENTS

| | | | | |
|---|---|---|---|---|
| 6,100,645 A * | 8/2000 | Moisin | ................... | H02M 1/425 315/205 |
| 6,122,182 A * | 9/2000 | Moisin | .................... | H02M 5/22 363/39 |
| 7,099,132 B2 * | 8/2006 | Moisin | ................. | H05B 39/048 315/DIG. 4 |
| 2013/0257297 A1 * | 10/2013 | Schmidt | ................. | H05B 35/00 315/182 |
| 2014/0145599 A1 * | 5/2014 | Goscha | ................. | H01J 65/048 315/34 |
| 2014/0145616 A1 * | 5/2014 | Goscha | ................. | H01J 65/048 315/85 |

* cited by examiner

*Primary Examiner* — Erick Glass
(74) *Attorney, Agent, or Firm* — Chun-Ming Shih

(57) ABSTRACT

A middle phase power-fetching type phase front/phase tail synchronized modulation circuit, comprising: a power supply unit, that is used to fetch power from the middle phase of an ordinary AC voltage waveform, and supplies it to a phase front/phase tail modulation unit as a normal operating voltage after rectification; and a phase front/phase tail modulation unit, it includes an MCU microcomputer, to control a driving circuit to turn-on, and control synchronously at least two bi-directional electronic power element, to generate a phase front/phase tail turn-on modulation signal. As such, while performing synchronous modulation from phase middle, phase front/phase tail can be retracted inward or expanded outward at the same time, so that phase front/ phase tail turn-on output voltage average values complement each other, hereby achieving stable and modulated power supply.

7 Claims, 7 Drawing Sheets

MIDDLE PHASE POWER-FETCHING TYPE PHASE FRONT/PHASE TAIL SYNCHRONIZED MODULATION CIRCUIT

BACKGROUND OF THE INVENTION

Field of the Invention

The present invention relates to a phase front/phase tail synchronized modulation circuit, and in particular to a middle phase power-fetching type phase front/phase tail synchronized modulation circuit, its output can be modulated synchronously from the middle phase, such that its phase front and phase tail can be refracted inward or expanded outward at the same time, so that the phase front turned-on output voltage average value and the phase tail turned-on output voltage average value complement each other, in achieving a stable and modulated power supply.

The Prior Arts

In general, the phase modulation circuit can be classified into a phase front modulation circuit and a phase tail modulation circuit, and it is utilized extensively in our daily life. In particular, it is used mostly frequently in modulation of illuminance of a light and rotation speed of an electric fan motor.

The conventional phase tail modulations are realized mostly through using a TRIAC transistor switches. The drawback of this type of phase tail modulation is that, once it is triggered to turn-on, it can not be turned off until the end of the phase cycle. In addition, the instantaneous activation current is rather large, thus it is apt to create a large peak current and large Electromagnetic Interference (EMI), and is liable to cause magnetic or light filament vibration noise, to cause light blinking. On the other hand, conventional phase front modulations are realized mostly through an MOSFET transistor switch. In its control, it can first be turned on and then turned off, to trigger accurately the zero phase activation. In application, its advantage is that, it will not produce large peak current, so that in activation, it will not generate large EMI, to reduce filament noise of incandescent light, so that its modulation effect is much better than that of the conventional TRIAC phase tail modulation.

The phase modulation circuit of the Prior Art is realized through phase front modulation or phase tail modulation. In other words, in a half cycle of voltage waveform, only a single phase modulation of either phase front or phase tail is performed. However, when the phase of a power supply is drifting, the increase of width of phase front or phase tail will cause the light to become brighter, while the decrease of width of phase front or phase tail will cause the light to become dimmer, thus it is liable to cause blinking and noise. For this reason, an improvement is proposed in U.S. Pat. No. 7,099,132B2, wherein the circuit is turned on through combining the phase front and phase tail turn-ons, to effectively overcome the shortcomings of the either type of the two single phase modulations mentioned above.

However, quite a lot of the drawbacks still exist in U.S. Pat. No. 7,099,132B2. Refer to FIGS. 9 and 10 respectively for a circuit diagram of U.S. Pat. No. 7,099,132B2 according to the Prior Art; and a waveform diagram of phase front and phase tail modulation of U.S. Pat. No. 7,099,132B2 according to the Prior Art. As shown in FIGS. 9 and 10, in the positive half cycle of AC voltage, MOSFET Q01 is turned on first, then the positive voltage passes through diode FW1 to load LOAD, then it arrives at MOSFET Q01. When voltage of the positive half cycle reaches point PNC1, MOSFET Q02 is turned on, while MOSFET Q01 is turned off. When the voltage in the positive half cycle reaches point PC1, MOSFET Q02 is turned off, while MOSFET Q01 is turned on, till the end of the positive half cycle of voltage. In the negative half cycle of AC voltage, MOSFET Q11 is turned on first, then the negative voltage passes through diode FW2 to load LOAD, then it arrives at MOSFET Q11. When voltage of the negative half cycle reaches point PNC2, MOSFET Q12 is turned on, while MOSFET Q11 is turned off. When the voltage in the negative half cycle reaches point PC2, MOSFET Q12 is turned off, while MOSFET Q11 is turned on, till the end of the negative half cycle of voltage.

In the descriptions above, in the positive and negative half cycles, when MOSFETs Q01 and Q11 are turned on, the current will pass through diode FW1 or FW2, to create voltage drop of 0.7V to cause overheating. The shortcoming of this design is that, basically, when 1 A current is passed, it could cause power loss of 1.4 W. In case 2 A current is passed through, the heat thus produced could cause MOSFETs Q01 and Q11 to reach a temperature as high as 80~90° C. Another shortcoming of this design is that, the two transistors Q02 and Q12 in the circuit are turned-on and turned-off by the divided voltage of AC power supply. The operation points of transistors Q02 and Q12 are adjusted respectively through using P01 and D11, thus they can not fulfill the demand of complete synchronization. Therefore, the imbalance of output power between the positive half cycle and the negative half cycle could cause blinking of lights. In particular, when the voltage is not stable and can not be synchronized, the blinking of lights is especially evident. A further shortcoming of that U.S. patent is that, it can not derive the power it requires from the AC voltage waveform, a separate power circuit have to be designed to provide power. In addition, that circuit is not capable of preventing overheating and overload. As such, even when overheating occurs, the circuit can not be turned off, such that it will continue to heat up, until the circuit is burned out.

Therefore, presently, the design and performance of phase front/phase tail modulation circuit is not quite satisfactory, and it has much room for improvement.

SUMMARY OF THE INVENTION

In view of the problems and drawbacks of the prior art, the present invention provides a middle phase power-fetching type phase front/phase tail synchronized modulation circuit, to overcome the shortcomings of the prior art.

A major objective of the present invention is to provide a middle phase power-fetching type phase front/phase tail synchronized modulation circuit, including: a power supply unit, and a phase front/phase tail modulation unit. Wherein, the phase front/phase tail modulation unit includes a MCU microcomputer, a driving circuit, and two bi-directional electronic power supply elements.

In the descriptions mentioned above, the power supply unit is used to fetch power from the middle phase of an ordinary AC voltage waveform, and it supplies the normal operating voltage to the phase front/phase tail modulation unit after rectification. The MCU microcomputer is connected to and controls the turn-on and turn-off of the driving circuit, which in turn controls the at least two bi-directional electronic power supply elements synchronously, to generate a phase front/phase tail turn-on modulation signal.

As such, in performing middle phase synchronous modulation, the phase front/phase tail can be refracted inward or expanded outward at the same time, so that the phase front turn-on output voltage average value and the phase tail turn-on output voltage average value complement each other, in achieving a stable and modulated power supply.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Refer to FIGS. 1 to 4 respectively for is a circuit diagram of a middle phase power-fetching type phase front/phase tail synchronized modulation circuit according to a first embodiment of the present invention; a middle phase power-fetching type phase front/phase tail synchronized modulation circuit according to a second embodiment of the present invention; a circuit diagram of a middle phase power-fetching type phase front/phase tail synchronized modulation circuit, when it is applied to a 3-wire power supply; and a circuit diagram of a middle phase power-fetching type phase front/phase tail synchronized modulation circuit, when it is applied to a 2-wire power supply.

Figure 1:
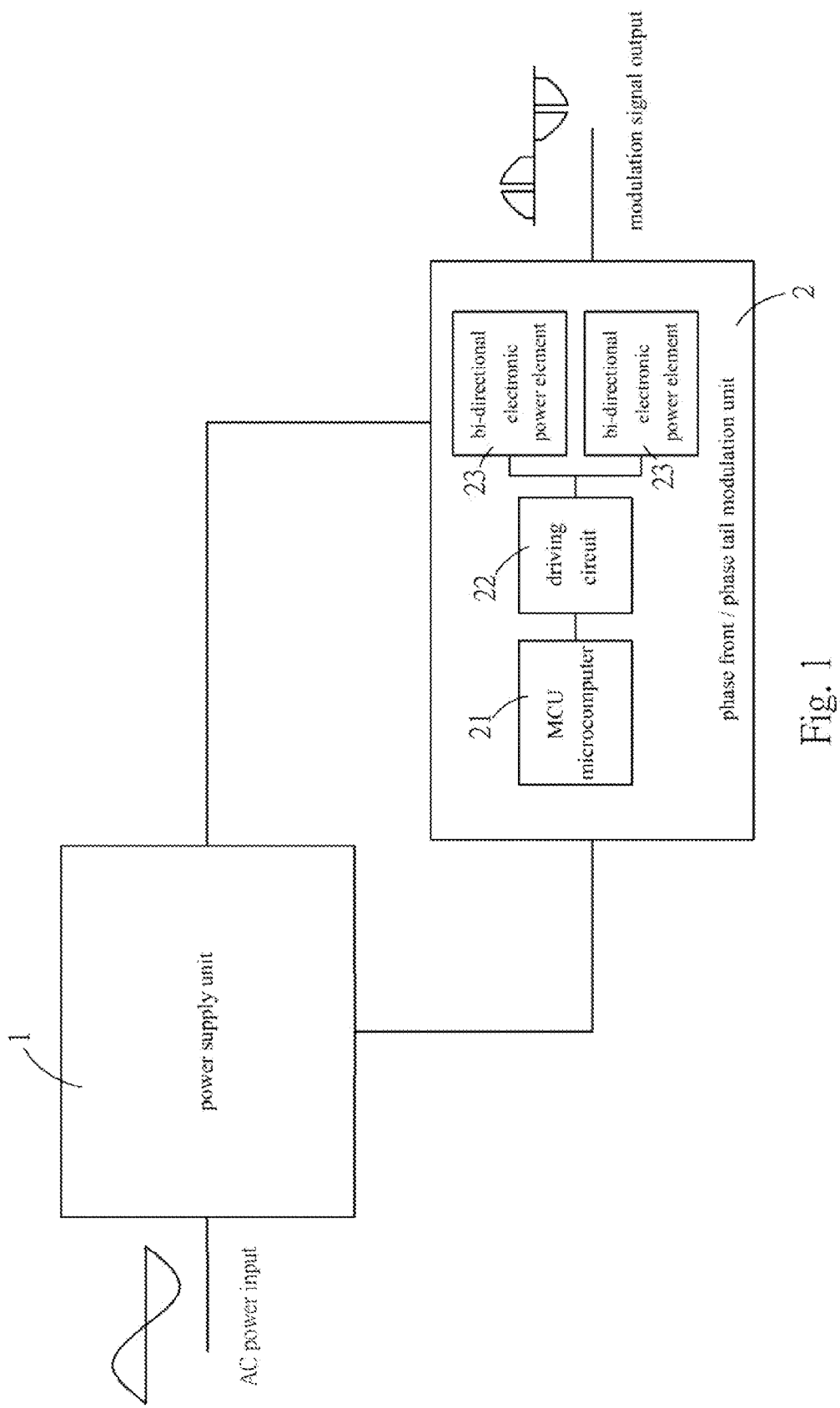
FIG. 1 is a circuit diagram of a middle phase power-fetching type phase front/phase tail synchronized modulation circuit according to a first embodiment of the present invention.

As shown in FIGS. 1 to 4, for the first embodiment of the present invention of FIG. 1, the middle phase power-fetching type phase front/phase tail synchronized modulation circuit includes: a power supply unit 1, and a phase front/phase tail modulation unit 2. Wherein, the phase front/phase tail modulation unit includes a MCU microcomputer 21, a driving circuit 22, and two bi-directional electronic power supply elements 23.

In the descriptions mentioned above, the power supply unit 1 is used to fetch power from the middle phase of an ordinary AC voltage waveform, and it supplies the normal operating voltage to the phase front/phase tail modulation unit 2 after rectification. The MCU microcomputer 21 is connected to the driving circuit 22 and controls its turn-on and turn-off, which in turn controls the at least two bi-directional electronic power supply elements 23 (that can be Power MOSFET Q1 and Q2) synchronously (refer to FIGS. 3 and 4), to generate a phase front/phase tail turn-on modulation signal.

In performing middle phase synchronous modulation, the phase front/phase tail can be retracted inward or expanded outward at the same time, so that the phase front turned-on output voltage average value and the phase tail turned-on output voltage average value complement each other, in achieving a stable and well modulated power supply.

Figure 2:
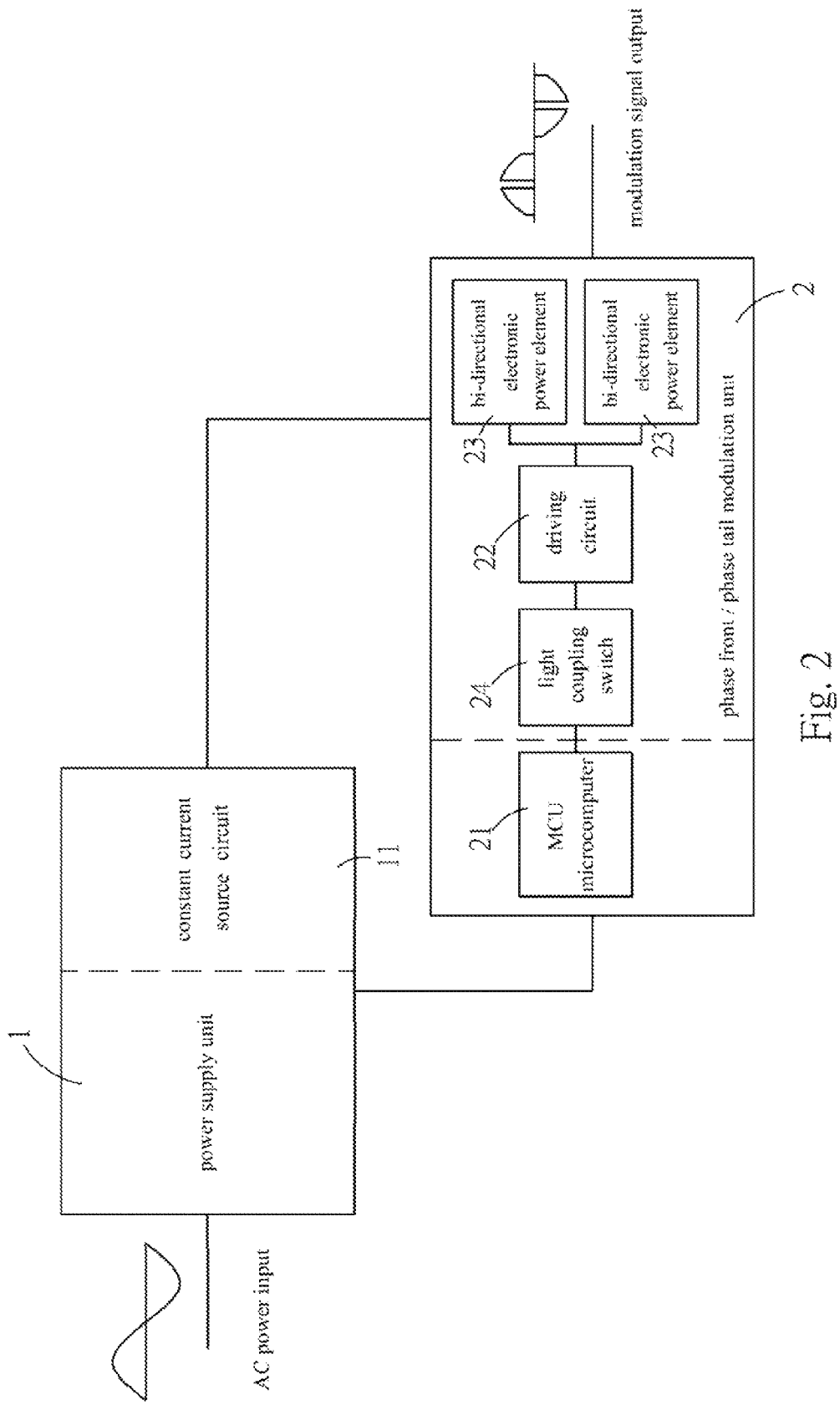
FIG. 2 is a circuit diagram of a middle phase power-fetching type phase front/phase tail synchronized modulation circuit according to a second embodiment of the present invention.

As shown in FIG. 2, the middle phase power-fetching type phase front/phase tail synchronized modulation circuit includes: a power supply unit 1, a constant current source circuit 11 and a phase front/phase tail modulation unit 2. Wherein, the phase front/phase tail modulation unit 2 includes a MCU microcomputer 21, a light coupling switch 24, a driving circuit 22, and two bi-directional electronic power supply elements 23. In operation, the power supply unit 1 fetches power from the middle phase of voltage waveform of an ordinary AC power supply, and it supplies the power to the driving circuit 22 through the constant current source circuit 11. The MCU microcomputer 21 is separated from and controls the driving circuit 22 through a light coupling switch 24.

Figure 3:
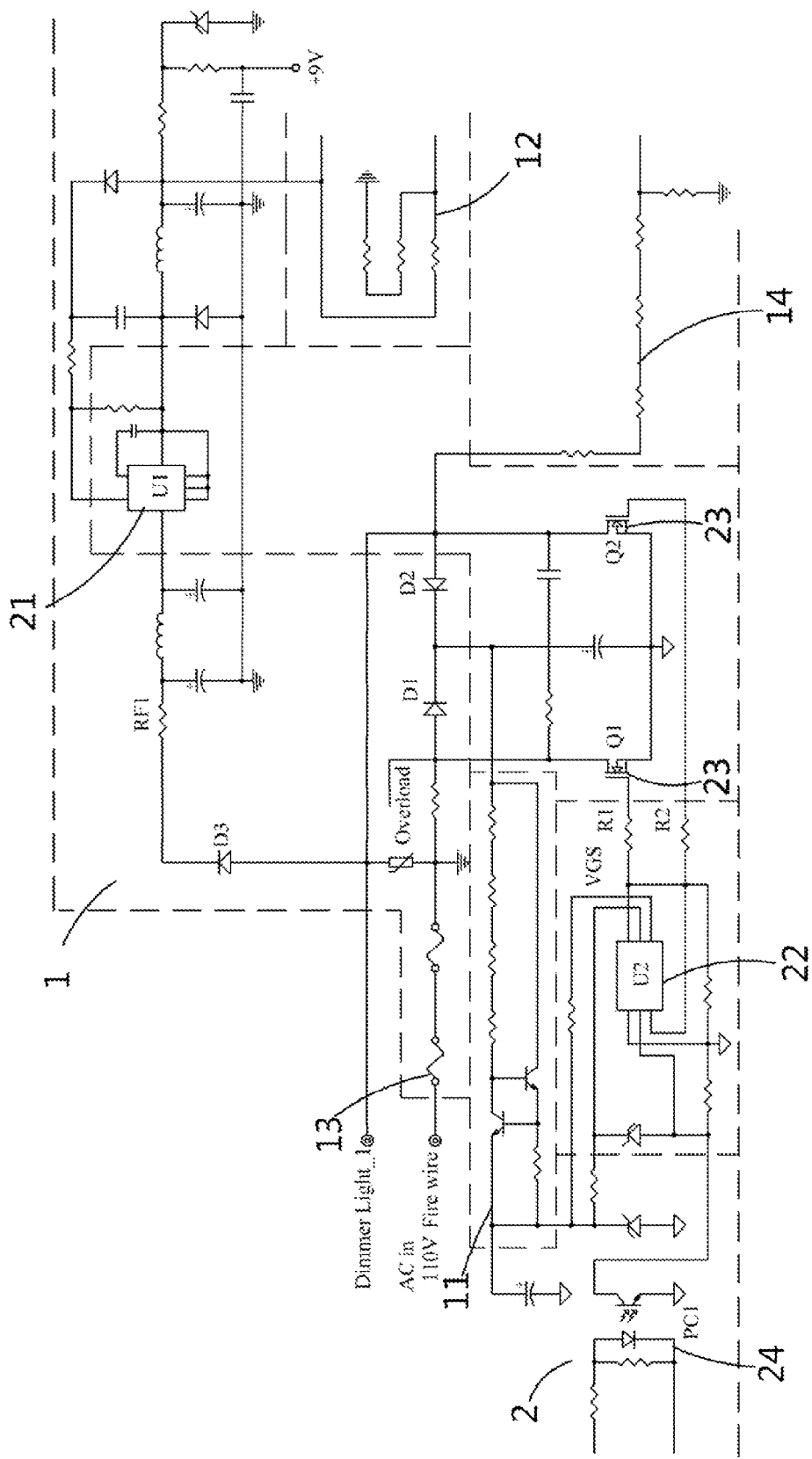
FIG. 3 is a circuit diagram of a middle phase power-fetching type phase front/phase tail synchronized modulation circuit of the present invention, when it is applied to a 3-wire power supply.
Figure 4:
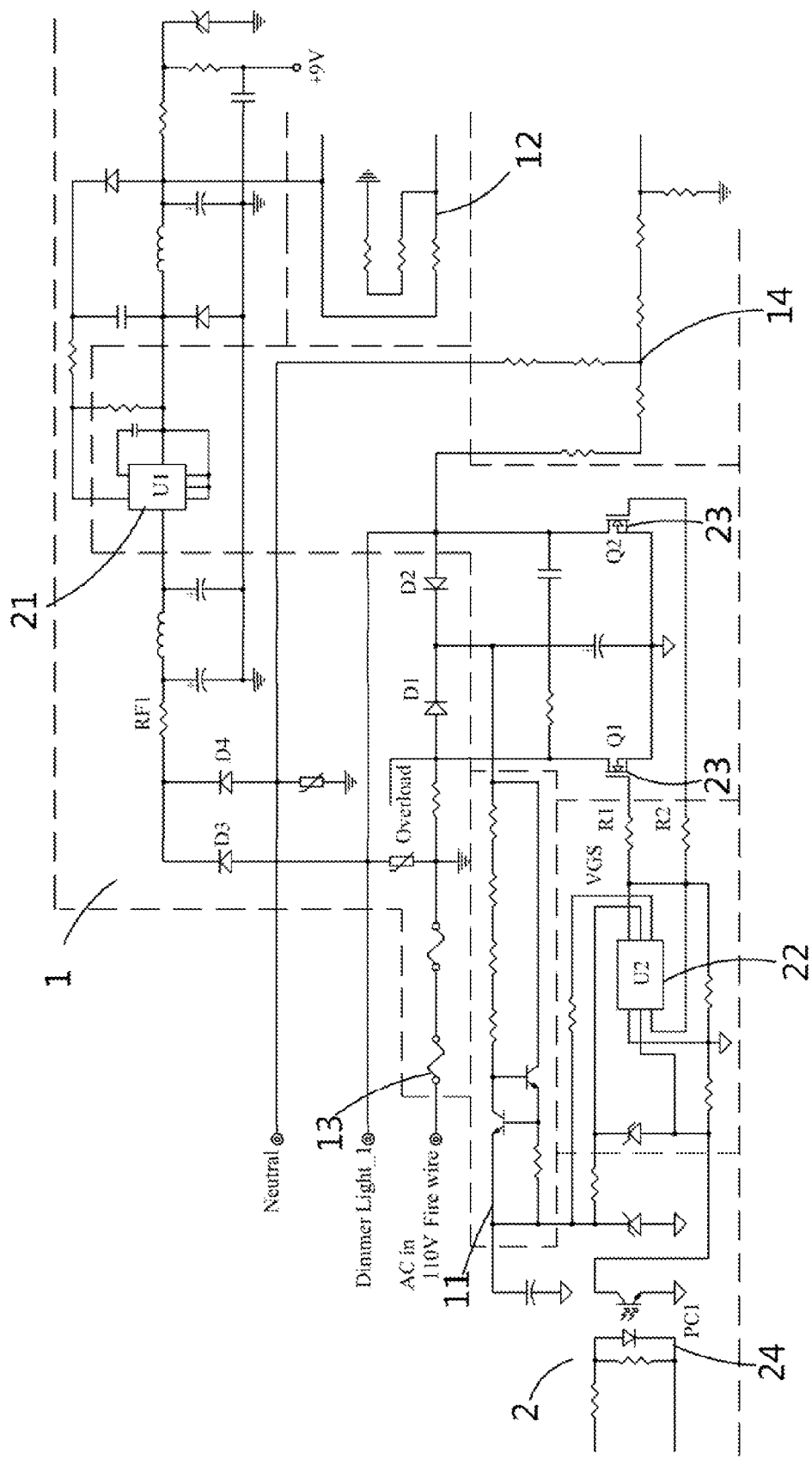
FIG. 4 is a circuit diagram of a middle phase power-fetching type phase front/phase tail synchronized modulation circuit of the present invention, when it is applied to a 2-wire power supply.

In addition, as shown in FIGS. 3 and 4, the power supply unit 1 can be provided further with an operation temperature detection and protection circuit 12 and a fuse 13, to provide sufficient protection to the entire modulation circuit. Further, the power supply unit 1 is provided with an AC zero voltage activation and sampling circuit 14, so that the MOSFETs Q1 and Q2 of the two bi-directional electronic power elements 23 can be activated synchronously utilizing zero voltage. As such the MOSFETs Q1 and Q2 are activated at the zero phase point to perform accurate switching, in achieving reduced noise and EMI.

Refer again to FIGS. 3 and 4, wherein in FIG. 3 is shown the present invention is used with a 3-wire power supply, while in FIG. 4 is shown the present invention is used with a 2-wire power supply. The output ends of the both mentioned above can be connected to an ordinary light for illuminance adjustment (not shown), or it can be connected to a motor for speed adjustment (not shown). Further, in actual production, the phase front/phase tail modulation unit 2 can be made into a separate IC circuit module. Or, alternatively, the power supply unit 1 and the phase front/phase tail modulation unit 2 can be made into an integrated IC circuit module, such that the various applications of phase modulation can be more simple and convenient.

To be more specific, the operation principle of circuit of the present invention is that, it utilizes the approach of phase front/phase tail turn-on and middle phase modulation, such that the power supply unit 1 fetches power from the middle phase of the ordinary AC power supply waveform. Then, after rectification, it is provided to the phase front/phase tail modulation unit 2 as the normal operation voltage. As such, the voltage of the middle phase is rectified by diode D3 of the two-wire power supply (or diodes D3 and D4 of a three-wire power supply), and it is supplied to U1 of MCU microcomputer 21 through RF1 as the normal operation voltage. Meanwhile, the remaining power of this middle phase is rectified by diodes D1 and D2, and it is supplied to the IC of U2 of the driving circuit 22 through the constant current source circuit 11, and it is used as the operation voltage to drive MOSFETs Q1 and Q2 of the two bi-directional electronic power elements 23.

In operation, the PC 1 of the light coupling switch 24, that separate the U1 of MCU microcomputer 21, is connected to the IC of U2 of the driving circuit 22, to generate VGS synchronous driving signal waveform (refer to the lower portions of FIGS. 5 and 6), and is able to turn-on or turn-off the MOSFETs Q1 and Q2 of the two bi-directional electronic power elements 23. Wherein, the S pin of MOSFETs Q1 and Q2 are shared by both, while the G pin of MOSFETs Q1 and Q2 are also shared by both. Then, it is connected to IC of U2 of the driving circuit 22 through resistors R1 and R2, in achieving the objective of simultaneous turn-on and turn-off.

When activating the circuit in the positive half cycle, the AC In circuit is connected to the lamp wire through turning on MOSFETs Q1 and Q2. While in the negative half cycle, the AC In circuit is connected to the lamp wire through turning on MOSFETs Q1 and Q2 in the reverse direction, and it will likewise complete this circuit, thus effectively generating synchronous modulation signal waveform combining the phase front and phase tail turn-on (refer to upper portions of FIGS. 5 and 6). Through using MCU microcomputer 21 to calculate time for precise synchronous turn-on, stability of light adjustment is raised significantly.

Figure 5:
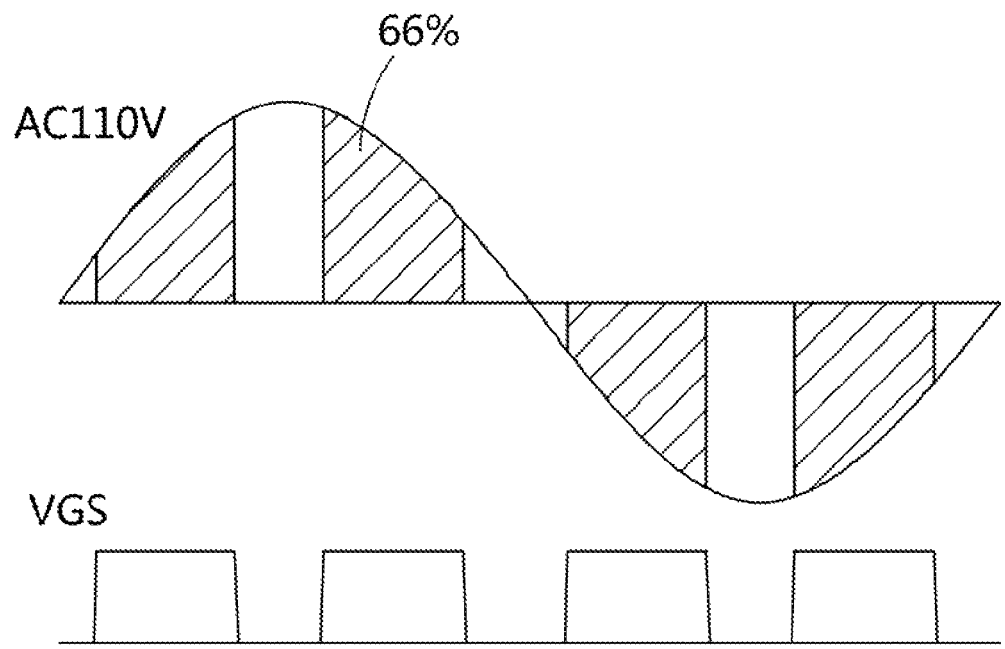
FIG. 5 is a modulation signal waveform diagram for a phase front/phase tail turn-on modulation ratio of 66% according to the present invention.
Figure 6:
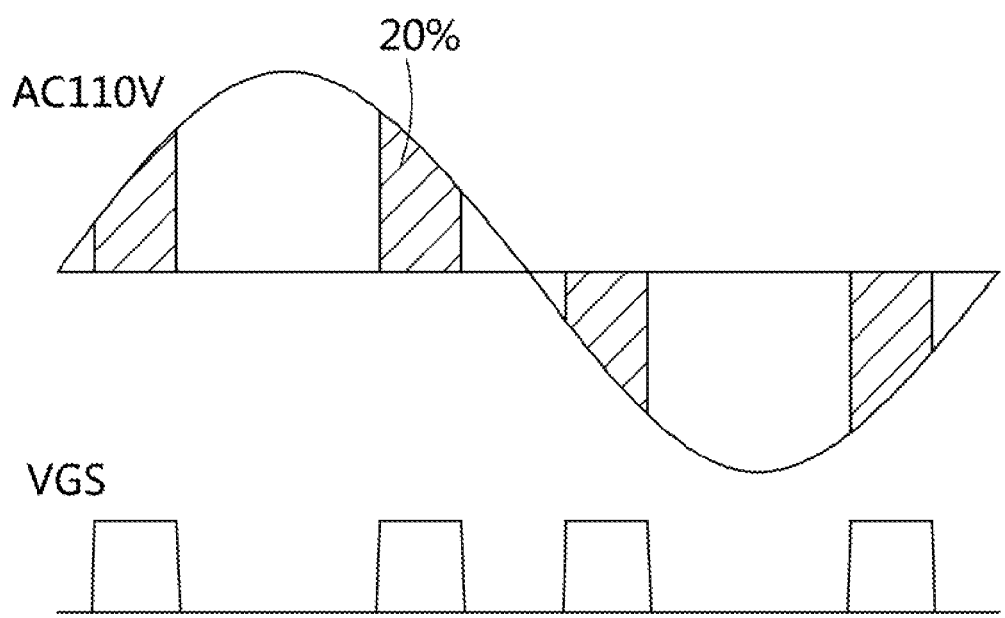
FIG. 6 is a modulation signal waveform diagram for a phase front/phase tail turn-on modulation ratio of 20% according to the present invention.

Refer to FIG. 5 for a modulation signal waveform diagram for a phase front/phase tail turn-on modulation ratio of 66% according to the present invention. As shown in FIG. 5, the VGS waveform generated by the driving circuit 22 as driven by MCU microcomputer 21, is used control and drive the MOSFETs Q1 and Q2 of the two bi-directional electronic power elements 23 to turn on, to perform modulation in sine wave curve, to generate modulation signal waveform having phase front/phase tail turn-on modulation ratio of 66%. Then, refer to FIG. 6 for a modulation signal waveform diagram of a phase front/phase tail turn-on modulation ratio of 20% according to the present invention. As shown in FIG. 6, in the modulation signal waveform, the turn-off portion are much more larger than the turn-on portion, such that it produces a modulation signal waveform having a phase front/phase tail turn-on modulation ratio of 20%.

In the implementation of the present invention for the combined phase front/phase tail turn-on modulation, when the phase front/phase tail turn-on modulations expand or retract, that could result in stable complement of output voltage average values. Meanwhile, that could achieve reduced EMI and stable output voltage average values. When this effect is utilized in LED light modulation and lamp light modulation, it could improve the illuminance blinking problem significantly. Also, when this effect is utilized in the control of motor rotation speed, it could reduce the noise caused by magnetism significantly.

Figure 7:
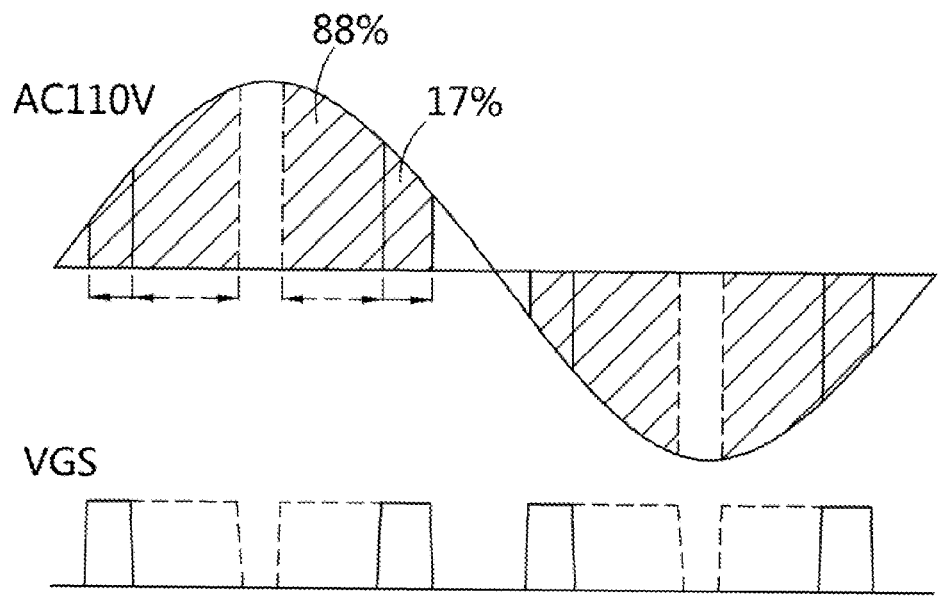
FIG. 7 is a modulation signal waveform diagram for an optimized phase front/phase tail turn-on modulation ratio of 17%~88% according to the present invention.

Refer to FIG. 7 for a modulation signal waveform diagram for an optimized phase front/phase tail turn-on modulation ratio of 17%~88% according to the present invention. As shown in FIG. 7, as proved and verified by experiments, the an optimized phase front/phase tail turn-on modulation ratio is at 17%~88%. The modulated width of middle phase of the waveform could affect the widths of phase front/phase tail turn-on. But it has to be noted that, for the positive half cycle of a waveform, the turn-on would occur twice. Similarly, for the negative half cycle of a waveform, the turn-on would occur twice, in achieving reducing blinking and noise of double frequency turn-on.

Figure 8:
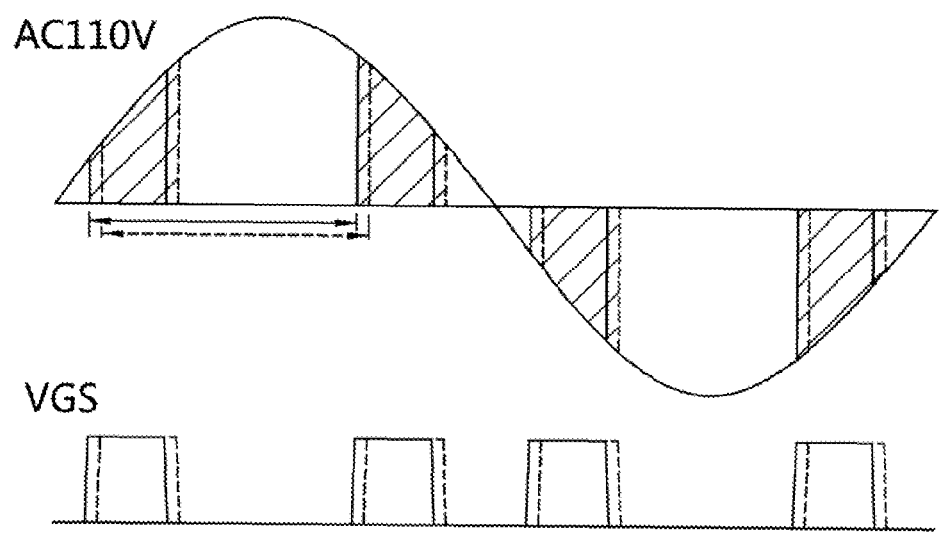
FIG. 8 is a waveform diagram of an example of a phase front/phase tail turn-ons complement to each other according to the present invention.
Figure 9:
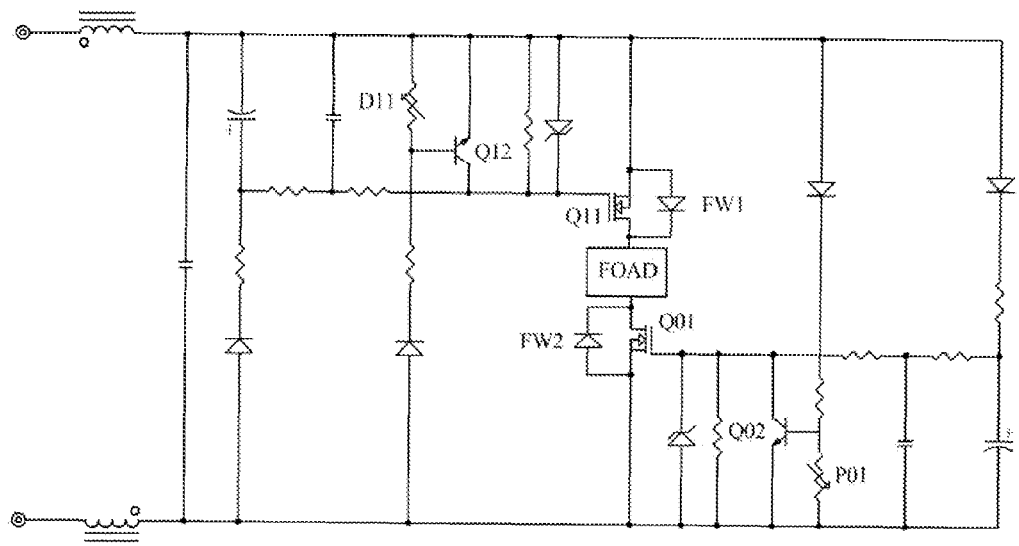
FIG. 9 is a circuit diagram for U.S. Pat. No. 7,099,132B2 according to the Prior Art.
Figure 10:
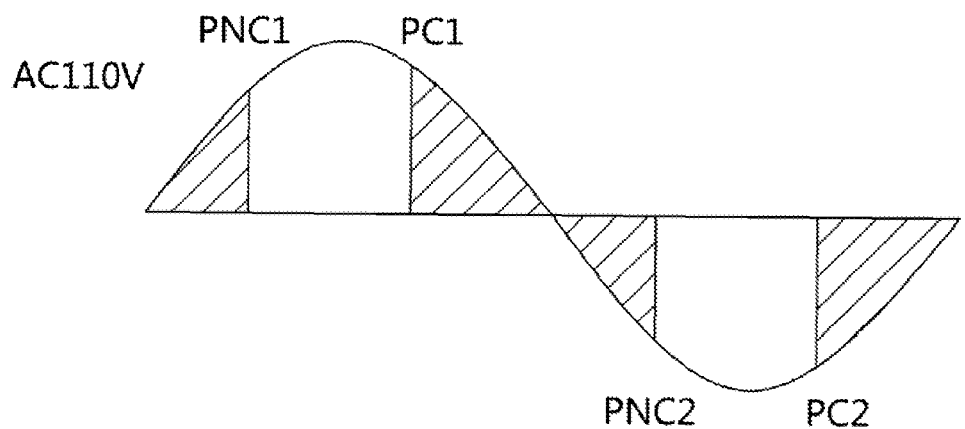
FIG. 10 is a waveform diagram for a phase front/phase tail modulation for circuit of FIG. 9 according to the Prior Art.

Finally, refer to FIG. 8 for a waveform diagram of an embodiment of a phase front/phase tail turn-ons complement to each other according to the present invention. As shown in FIG. 8, in the present invention, VGS is used to control width and relative position of a waveform, to determine the modulated power supply. When the AC power supply is not stable such that phase drift occurs, the phase front turn-on and phase tail turn-on may complement each other. For example, when the phase front turn-on on one side is drifted forward or backward 5%, then the phase tail turn-on on the other side will be drifted forward or backward 5%, so that through modulation the average total output power remains constant. In this approach, the present invention is able to achieve stable modulation, to effectively reduce blinking and noise Further, in the present invention, the modulation is achieved through using the MCU microcomputer 21 to trigger synchronously the MOSFETs Q1 and Q2 of the two bi-directional electronic power elements 23, so this could bypass the diodes to solve the problem of over-heating of the prior art. In addition, the present invention is provided with circuit design of overheating and overload prevention, to overcome the drawbacks of the Prior Art.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A middle phase power-fetching type phase front/phase tail synchronized modulation circuit, comprising:
    a power supply unit, and
    a phase front/phase tail modulation unit, including an MCU microcomputer, a light coupling switch, a driving circuit, and two bi-directional electronic power supply elements,
    wherein, said power supply unit is used to fetch power from a middle phase of an ordinary AC voltage waveform, and supplies it to said phase front/phase tail modulation unit as a normal working voltage after rectification, and wherein said MCU microcomputer controls said driving circuit separated by said light coupling switch to turn-on, to control synchronously at least two Power MOSFETs of bi-directional electronic power supply elements, so as to generate a phase front/phase tail turn-on modulation signal;
    wherein said power supply unit supplies power to said driving circuit through a constant current circuit;
    wherein said power supply unit further includes an AC zero voltage activation and sampling circuit, to activate said electronic power element at zero voltage.

2. The middle phase power-fetching type phase front/phase tail synchronized modulation circuit as claimed in claim 1, wherein said a phase front/phase tail modulation unit is packaged into an integrated circuit (IC) module.

3. The middle phase power-fetching type phase front/phase tail synchronized modulation circuit as claimed in claim 1, wherein said power supply unit further includes an operation temperature detection and protection circuit.

4. The middle phase power-fetching type phase front/phase tail synchronized modulation circuit as claimed in claim 3, wherein an optimal modulation ratio for phase front/phase tail turn-on output is defined at 17%~88%.

5. The middle phase power-fetching type phase front/phase tail synchronized modulation circuit as claimed in claim 3, wherein said power supply unit and said phase front/phase tail modulation unit are packaged into an integrated circuit (IC) module.

6. The middle phase power-fetching type phase front/phase tail synchronized modulation circuit as claimed in claim 3, wherein said synchronized modulation circuit is of a two-wire power supply type or a three-wire power supply type, with its output connected to a lamp for illuminance adjustment.

7. The middle phase power-fetching type phase front/phase tail synchronized modulation circuit as claimed in claim 3, wherein said synchronized modulation circuit is of a two-wire power supply type or a three-wire power supply type, with its output connected to a motor for rotation speed adjustment.

* * * * *